United States Patent
Monahan (10) Patent No.: US 11,980,959 B2
(45) Date of Patent: May 14, 2024

(54) ELECTROCHEMICAL MACHINING OF GEOMETRICALLY COMPLEX PASSAGES

(71) Applicant: Textron Innovations Inc., Providence, RI (US)

(72) Inventor: Kevin Joseph Monahan, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 336 days.

(21) Appl. No.: 17/691,116

(22) Filed: Mar. 9, 2022

(65) Prior Publication Data

US 2023/0286070 A1 Sep. 14, 2023

(51) Int. Cl.
*B23H 9/14* (2006.01)
*B23H 3/04* (2006.01)
*B23H 3/10* (2006.01)
*C25F 3/14* (2006.01)

(52) U.S. Cl.
CPC .......... *B23H 9/14* (2013.01); *B23H 3/04* (2013.01); *B23H 3/10* (2013.01); *C25F 3/14* (2013.01)

(58) Field of Classification Search
CPC ... B23H 9/14; B23H 9/16; B23H 3/10; B23H 3/04; C25F 3/14; C25F 7/00
See application file for complete search history.

(56) References Cited

U.S. PATENT DOCUMENTS

| 3,849,271 | A | 11/1974 | Joslin |
| 5,507,925 | A | 4/1996 | Brew |
| 6,632,337 | B2 | 10/2003 | Platz et al. |
| 8,535,491 | B2 | 9/2013 | Wei et al. |
| 9,416,462 | B2 * | 8/2016 | Zhan ................. C25F 3/02 |
| 9,878,388 | B2 * | 1/2018 | Mukai ............... B23H 7/265 |
| 9,975,176 | B2 | 5/2018 | Rutkowski |
| 10,046,389 | B2 | 8/2018 | Simpson |

FOREIGN PATENT DOCUMENTS

CN 111408804 A * 7/2020 ............. B23H 11/00

* cited by examiner

*Primary Examiner* — Nicholas A Smith
(74) *Attorney, Agent, or Firm* — Lawrence Youst PLLC (57) ABSTRACT

An electrochemical machining assembly for boring a passage in an electrically conductive workpiece. The electrochemical machining assembly includes an electrochemical machining tool having a telescoping collar with an articulating head coupled thereto. The telescoping collar is actuated between a contracted configuration and an extended configuration to advance the telescoping collar stepwise in the passage. The articulating head is tiltable relative to the telescoping collar to determine a direction of the passage. The electrochemical machining assembly is configured to remove material from the workpiece upon application of a voltage between the articulating head and the workpiece via a circulating electrolyte fluid to lengthen the passage.

20 Claims, 9 Drawing Sheets

ELECTROCHEMICAL MACHINING OF GEOMETRICALLY COMPLEX PASSAGES

TECHNICAL FIELD OF THE DISCLOSURE

The present disclosure relates, in general, to electrochemical machining assemblies operable to bore passages in electrically conductive workpieces and, in particular, to electrochemical machining assemblies operable to bore geometrically complex passages in electrically conductive workpieces.

BACKGROUND

Electrochemical machining is a non-contact, material removal process that utilizes the principles of electrolysis to selectively dissolve metal from a surface of an electrically conductive workpiece. During electrochemical machining, an electrolyte solution is pumped between an electrochemical machining tool, which functions as a cathode, and the workpiece, which acts as the anode. The electrochemical machining tool is then moved toward the surface of the workpiece and a voltage is applied. When the electrochemical machining tool and the surface of the workpiece are separated by a predetermined distance, electrons cross the gap and material from the workpiece is dissolved. The flowing electrolyte solution carries away the dissolved metal and removes heat from the workpiece. As the electrochemical machining tool does not touch the workpiece during the electrochemical machining process, there is little to no wear suffered by the electrochemical machining tool. In addition, due to the lack of thermal and/or mechanical stresses applied to the workpiece during electrochemical machining, superior surface quality may be achieved.

One form of electrochemical machining is electrochemical boring of passages in an electrically conductive workpiece. This process involves advancing an electrochemical boring tool into the workpiece as an electrolyte solution is pumped through the electrochemical boring tool and as a voltage is applied to electrochemical boring tool to extend the passage. It has been found, however, that current techniques for electrochemical boring are limited to forming straight or linear passages. Accordingly, a need has arisen for improved electrochemical boring tools and improved electrochemical boring methods that are capable of forming non-linear and/or geometrically complex passages in electrically conductive workpieces.

SUMMARY

In a first aspect, the present disclosure is directed to an electrochemical machining assembly for boring a passage in an electrically conductive workpiece. The electrochemical machining assembly includes an electrochemical machining tool having a telescoping collar with an articulating head coupled thereto. The telescoping collar has a contracted configuration and an extended configuration. An electrolyte circulation system is configured to supply an electrolyte fluid to the electrochemical machining tool and receive the electrolyte fluid returning from the electrochemical machining tool. A power supply is configured to provide a voltage to the articulating head. The telescoping collar is actuatable between the contracted configuration and the extended configuration to advance the telescoping collar stepwise in the passage. The articulating head is tiltable relative to the telescoping collar to determine a direction of the passage. The electrochemical machining assembly is configured to remove material from the workpiece upon application of the voltage between the articulating head and the workpiece via the electrolyte fluid to lengthen the passage.

In some embodiments, the telescoping collar may be substantially cylindrical. In certain embodiments, the telescoping collar may be formed from an electrical insulating material. In some embodiments, the telescoping collar may include leading and trailing housing members that are configured to translate relative to one another to shift the telescoping collar between the contracted and extended configurations. In certain embodiments, the telescoping collar may have leading and trailing anchors that are configurable such that the trailing anchor has a gripping engagement with the passage when the telescoping collar is shifted from the contracted configuration to the extended configuration and the leading anchor has a gripping engagement with the passage when the telescoping collar is shifted from the extended configuration to the contracted configuration. In such embodiments, the leading and trailing anchors may be mechanically actuated between gripping and non-gripping configurations. In some embodiments, the telescoping collar may have leading and trailing seals that are configurable such that the trailing seal has a sealing engagement with the passage when the telescoping collar is shifted from the contracted configuration to the extended configuration and the leading seal has a sealing engagement with the passage when the telescoping collar is shifted from the extended configuration to the contracted configuration. In such embodiments, the leading and trailing seals may be mechanically actuated between sealing and non-sealing configurations.

In certain embodiments, the articulating head may be a substantially spherical head. In some embodiments, the articulating head may be formed from an electrically conductive material. In certain embodiments, the articulating head may include one or more electrolyte fluid outlets configured to inject the electrolyte fluid into the passage forward of the articulating head. In some embodiments, the articulating head may have a tilting degree of freedom and a rotational degree of freedom relative to the telescoping collar. In certain embodiments, at least one actuator disposed within the telescoping collar may be configured to tilt the articulating head relative to the telescoping collar. In some embodiments, at least one actuator disposed within the telescoping collar may be configured to rotate the articulating head relative to the telescoping collar. In certain embodiments, the voltage provided by the power supply may be a pulsed voltage. In some embodiments, the passage formed by the electrochemical machining assembly may be a non-linear passage or a geometrically complex passage.

In a second aspect, the present disclosure is directed to a method of boring a passage in an electrically conductive workpiece. The method includes positioning an electrochemical machining tool in the passage, the electrochemical machining tool including a telescoping collar and an articulating head coupled to the telescoping collar; circulating an electrolyte fluid through the electrochemical machining tool; injecting at least a portion of the electrolyte fluid into the passage forward of the articulating head; advancing the telescoping collar stepwise in the passage by actuating the telescoping collar between contracted and extended configurations; determining a direction of the passage by tilting the articulating head relative to the telescoping collar; and lengthening the passage by applying a voltage between the articulating head and the workpiece via the electrolyte fluid to remove material from the workpiece.

The method may also include establishing a gripping engagement between a trailing anchor of the telescoping collar and the passage; actuating the telescoping collar from the contracted configuration to the extended configuration; establishing a gripping engagement between a leading anchor of the telescoping collar and the passage; actuating the telescoping collar from the extended configuration to the contracted configuration; establishing a sealing engagement between a trailing seal of the telescoping and the passage; actuating the telescoping collar from the contracted configuration to the extended configuration; establishing a sealing engagement between a leading seal of the telescoping collar and the passage; actuating the telescoping collar from the extended configuration to the contracted configuration; and/or forming a non-linear passage such as a geometrically complex passage.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including moving and/or non-moving mechanical connections.

Figure 1A:
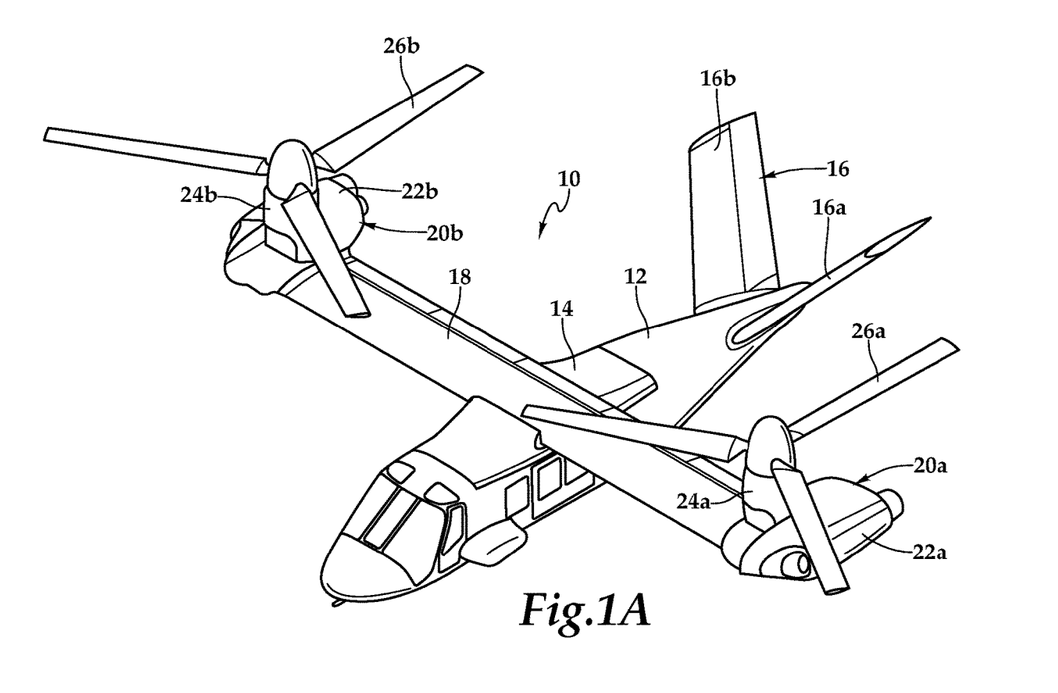
FIGS. 1A-1B are schematic illustrations of a tiltrotor aircraft including components formed using an electrochemical machining assembly and/or electrochemical machining methods in accordance with embodiments of the present disclosure.
Figure 1B:
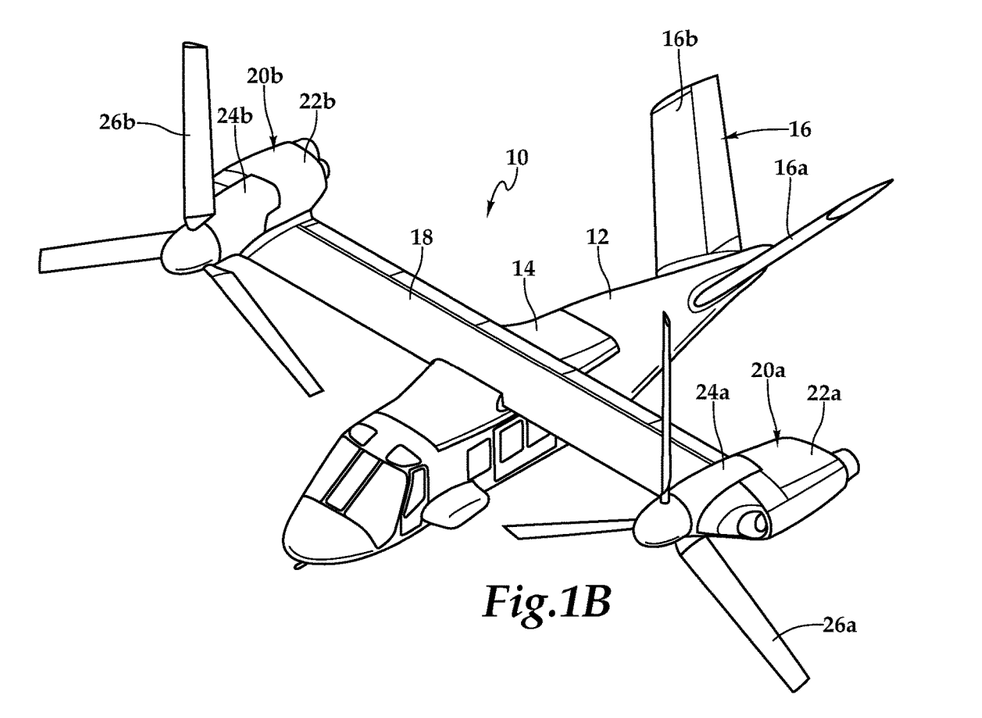

Referring initially to FIGS. 1A-1B in the drawings, a tiltrotor aircraft including components formed using an electrochemical machining assembly and/or electrochemical machining methods as described herein is schematically illustrated and generally designated 10. Aircraft 10 includes a fuselage 12, a wing mount assembly 14 that is rotatable relative to fuselage 12 and a tail assembly 16 including rotatably mounted tail members 16a, 16b having control surfaces operable for horizontal and/or vertical stabilization during forward flight. A wing 18 is supported by wing mount assembly 14 and rotates with wing mount assembly 14 relative to fuselage 12 to enable tiltrotor aircraft 10 convert to a storage configuration. Together, fuselage 12, tail assembly 16 and wing 18 as well as their various frames, longerons, stringers, bulkheads, spars, ribs, skins and the like may be considered to be the airframe of tiltrotor aircraft 10.

Located proximate the outboard ends of wing 18 are propulsion assemblies 20a, 20b. Propulsion assembly 20a includes a fixed nacelle 22a that houses an engine and a fixed portion of the drive system. In addition, propulsion assembly 20a includes a pylon assembly 24a that is positioned inboard of fixed nacelle 22a and above wing 18. Pylon assembly 24a is rotatable relative to fixed nacelle 22a and wing 18 between a generally vertical orientation, as best seen in FIG. 1A, a generally horizontal orientation, as best seen in FIG. 1B. Pylon assembly 24a includes a tiltable portion of the drive system and a proprotor assembly 26a that is rotatable responsive to torque and rotational energy provided via the engine and drive system. Likewise, propulsion assembly 20b includes a fixed nacelle 22b that houses an engine and a fixed portion of the drive system. In addition, propulsion assembly 20b includes a pylon assembly 24b that is positioned inboard of fixed nacelle 22b and above wing 18. Pylon assembly 24b is rotatable relative to fixed nacelle 22b and wing 18 between a generally vertical orientation, as best seen in FIG. 1A, a generally horizontal orientation, as best seen in FIG. 1B. Pylon assembly 24b includes a tiltable portion of the drive system and a proprotor assembly 26b that is rotatable responsive to torque and rotational energy provided via the engine and drive system.

FIG. 1A illustrates aircraft 10 in helicopter or VTOL flight mode, in which proprotor assemblies 26a, 26b are rotating in a substantially horizontal plane to provide a lifting thrust, such that aircraft 10 flies much like a conventional helicopter. FIG. 1B illustrates aircraft 10 in airplane or forward flight mode, in which proprotor assemblies 26a, 26b are rotating in a substantially vertical plane to provide a forward thrust enabling wing 18 to provide a lifting force responsive to forward airspeed, such that aircraft 10 flies much like a conventional propeller driven aircraft. It should be appreciated that aircraft 10 can be operated such that proprotor assemblies 26a, 26b are selectively positioned between airplane mode and helicopter mode, which can be referred to as a conversion flight mode.

Figure 2A:
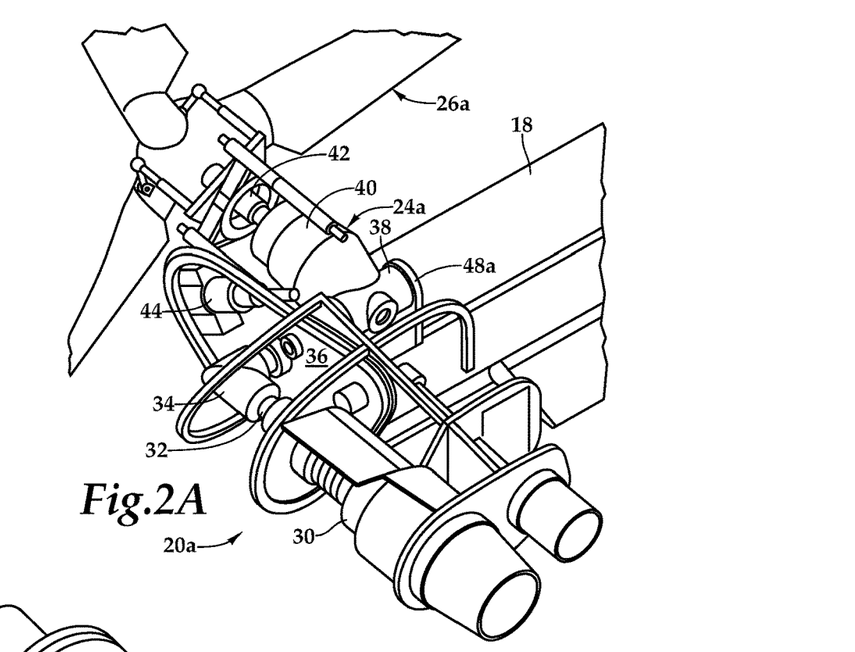
FIGS. 2A-2B are schematic illustrations of a propulsion assembly for a tiltrotor aircraft including components formed using an electrochemical machining assembly and/or electrochemical machining methods in accordance with embodiments of the present disclosure.
Figure 2B:
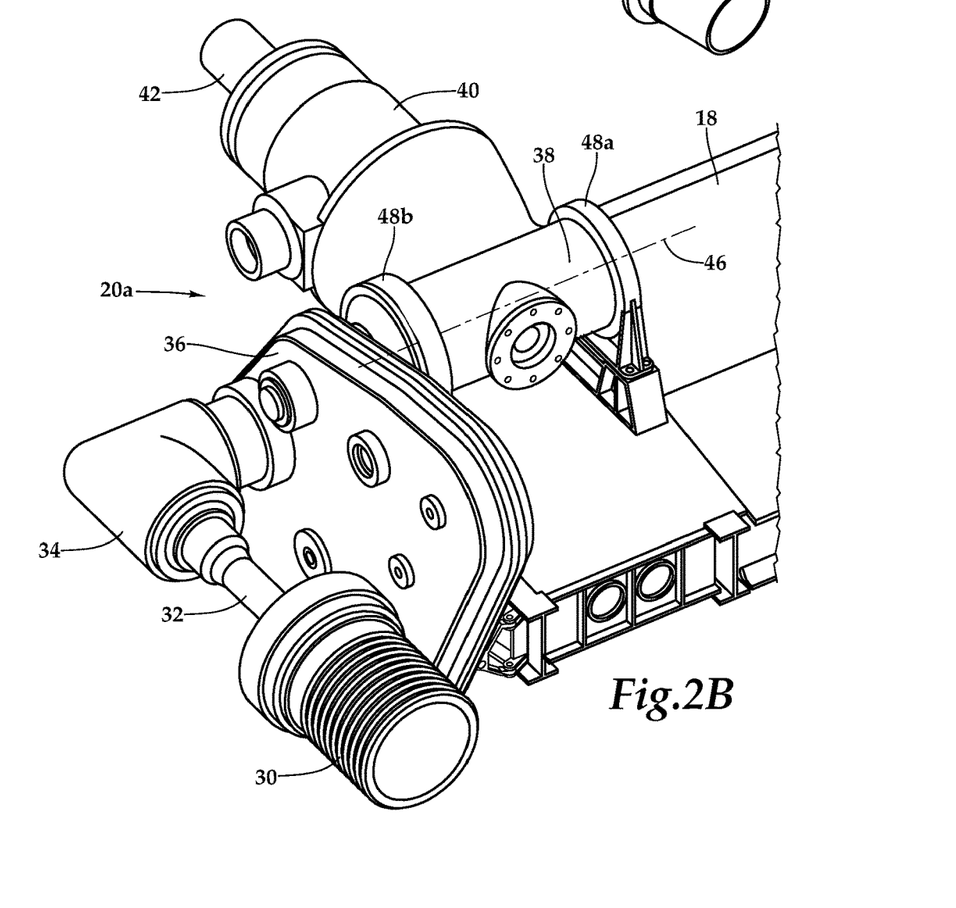

Referring additionally to FIGS. 2A-2B in the drawings, propulsion assembly 20a is disclosed in further detail. Propulsion assembly 20a is substantially similar to propulsion assembly 20b therefore, for sake of efficiency, certain features will be disclosed only with regard to propulsion assembly 20a. One having ordinary skill in the art, however, will fully appreciate an understanding of propulsion assembly 20b based upon the disclosure herein of propulsion assembly 20a. Propulsion system 20a includes an engine 30 that is fixed relative to wing 18. An engine output shaft 32 transfers power from engine 30 to a spiral bevel gearbox 34 that includes spiral bevel gears to change torque direction by 90 degrees from engine 30 to a fixed gearbox 36. An output shaft of fixed gearbox 36 transfers torque to an input gear of a spindle gearbox 38 which forms a first portion of a proprotor gearbox 40. A mast 42 of proprotor gearbox 40 transfers torque to proprotor assembly 26a. A conversion actuator 44 can be actuated so as to selectively rotate proprotor gearbox 40 and thus pylon assembly 24a about a conversion axis 46, which in turn selectively positions proprotor assembly 26a between helicopter mode, as best seen in FIG. 1A, and airplane mode, as best seen in FIG. 1B. The operational loads, such as thrust loads, are transmitted through mast 42 and into spindle gearbox 38 of proprotor gearbox 40 and thus the structural support of spindle gearbox 38 is critical. In the illustrated embodiment, spindle gearbox 38 is rotatably coupled to the airframe of tiltrotor aircraft 10 by mounting spindle gearbox 38 to an inboard bearing assembly 48a and an outboard bearing assembly 48b. Thus, spindle gearbox 38 is structurally supported and is operable to be rotated about conversion axis 46 by conversion actuator 44.

Figure 3:
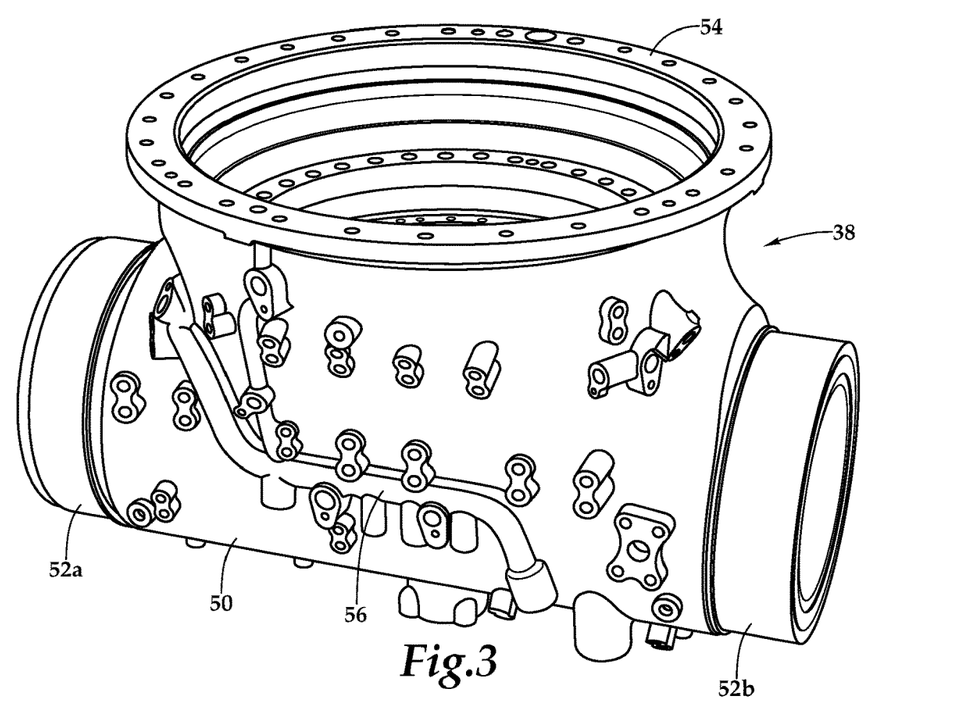
FIG. 3 is a schematic illustration of a gearbox housing for use in a propulsion assembly of a tiltrotor aircraft including components formed using an electrochemical machining assembly and/or electrochemical machining methods in accordance with embodiments of the present disclosure.

Referring additionally to FIG. 3 in the drawings, spindle gearbox 38 is disclosed in further detail. Spindle gearbox 38 includes an outer housing 50 that is formed from a strong yet light-weight material such as aluminum, which is an electrically conductive material. Outer housing 50 includes two bearing surfaces 52a, 52b that are received respectively in inboard bearing assembly 48a and outboard bearing assembly 48b. Outer housing 50 also includes an upper flange 54 that provides a mating assembly for coupling with the upper case of proprotor gearbox 40. Disposed within spindle gearbox 38 are a plurality of gears that enable the transfer of torque from engine 30 to proprotor assembly 26a and more specifically, from an input gear of spindle gearbox 38 to mast 42 which requires the gears to change the torque direction by 90 degrees. During operation of tiltrotor aircraft 10, lubrication oil must be circulated to the gears within spindle gearbox 38 to enable smooth operation of the gears and to transfer heat therefrom. To circulate lubrication oil to the desired locations, spindle gearbox 38 includes a plurality of passages and communication ports such as lubrication oil passage 56 that routes lubrication oil around the exterior of spindle gearbox 38. Due to the multiple locations within spindle gearbox 38 that require lubrication oil, lubrication oil passage 56 is a curvilinear passage and more specifically, lubrication oil passage 56 a geometrically complex passage that includes multiple branches, multiple curved portions, curves portions with different radii of curvature, curves portions with non-uniform radii curvature and/or other tortuous paths.

Conventionally, spindle gearboxes are formed by casting their outer housings including the lubrication oil passages. In particular, the lubrication oil passages are typically formed by incorporating a core in the shape of the passageway during the casting process. Such cores must be strong enough to withstand the high temperature of the molten aluminum but also brittle enough to break apart during the shakeout process that reveals the passage. It has been found, however, that casting lubrication oil passages for conventional spindle gearboxes is not a reliable process and has resulted in an unacceptably high failure rate. In addition, even when casting lubrication oil passages for conventional spindle gearboxes is successful, the interior surface of the resulting lubrication oil passages commonly has a higher than desirable surface roughness.

Figure 4A:
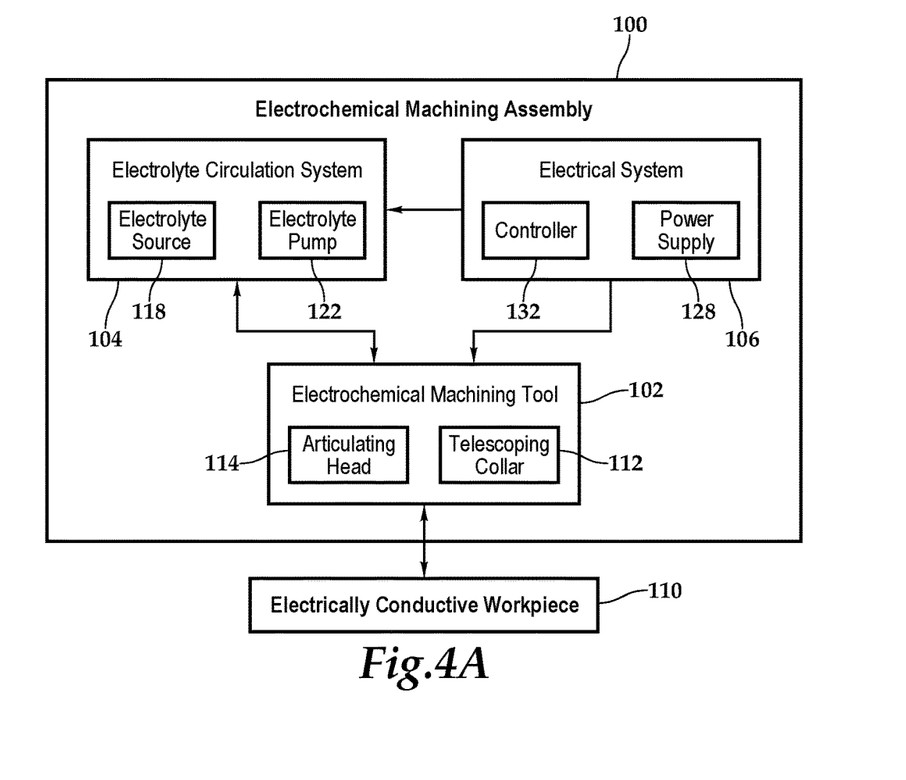
FIGS. 4A-4B are representations of an electrochemical machining assembly operating on an electrically conductive workpiece in accordance with embodiments of the present disclosure.
Figure 4B:
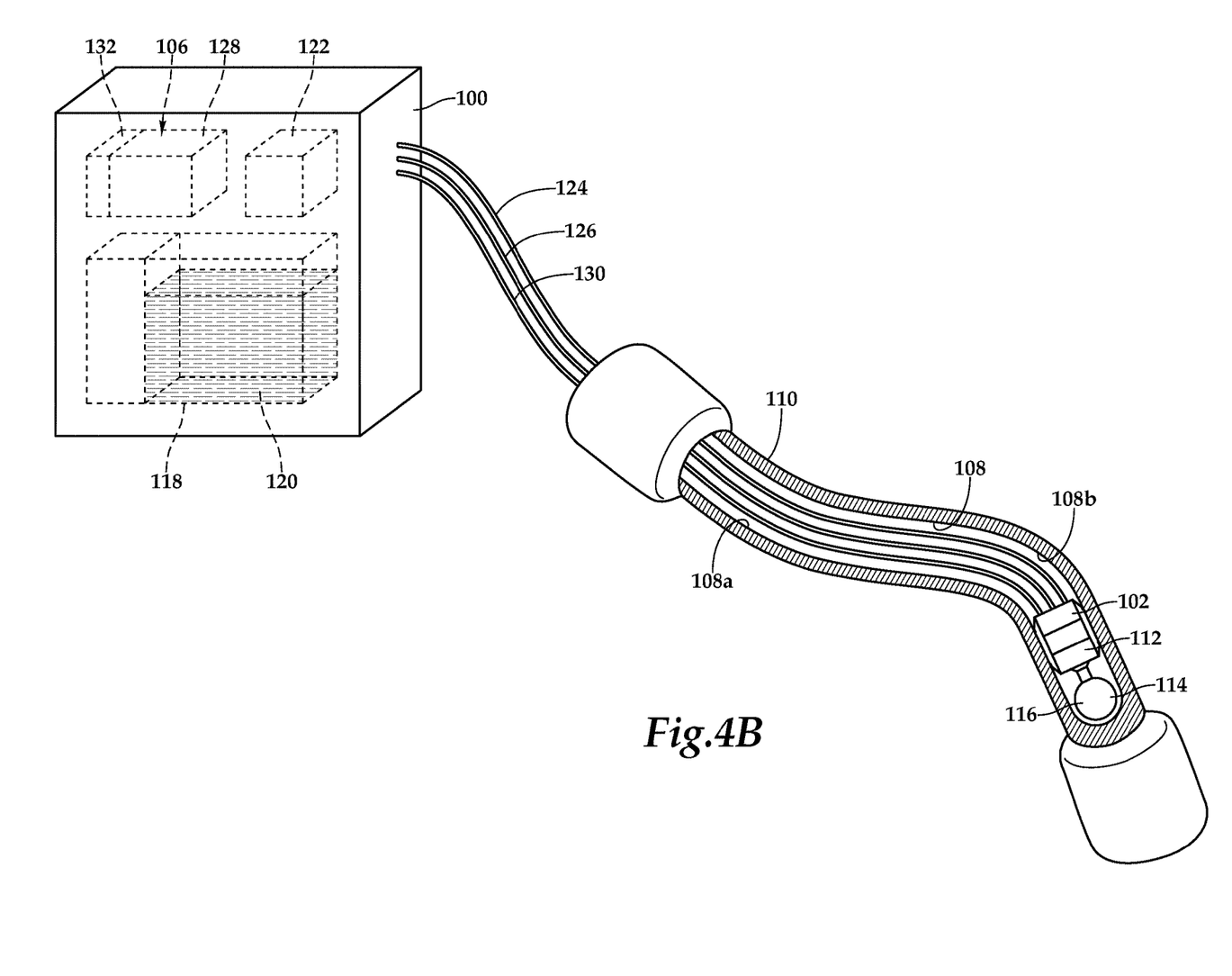

The presently disclosed electrochemical machining assemblies and methods overcome these drawbacks by reliability forming high precision passages in electrically conductive workpieces having superior surface qualities. Referring now to FIGS. 4A-4B in the drawings, an electrochemical machining assembly of the present disclosure will be discussed. In the illustrated embodiment, electrochemical machining assembly 100 includes an electrochemical machining tool 102, an electrolyte circulation system 104 and an electrical system 106. As illustrated, electrochemical machining tool 102 is forming a passage 108 in an electrically conductive workpiece 110 which is representative of lubrication oil passage 56 of spindle gearbox 38. In certain embodiments, passage 108 may have a diameter on the order of one-quarter of an inch to three-quarters of an inch such as half an inch. Even though spindle gearbox 38 has been describes as being form from aluminum, it should be understood by those having ordinary skill in the art that the electrochemical machining assembly disclosed herein may be used to form passages, including linear, curvilinear and geometrically complex passages in any electrically conductive workpiece including workpieces formed from other metals and metal alloys. In addition, even though passage 108 has been described as having a specific diameter, it should be understood by those having ordinary skill in the art that the electrochemical machining assembly disclosed herein may be used to form passages having other diameters both larger than three-quarters of an inch or small than one-quarter of an inch. Electrochemical machining tool 102 includes a telescoping collar 112 that has an articulating head 114 coupled to a leading end thereof. As discussed herein, telescoping collar 112 transitions between a contracted configuration and an extended configuration to advance electrochemical machining tool 102 in passage 108 in a stepwise manner. Telescoping collar 112 may include a substantially cylindrical outer housing that is formed from a dielectric material such a polymer, a ceramic or other suitably non electrically conducting material. Alternatively or additionally, the outer housing of telescoping collar 112 may include an insulating coating that prevents current flow between telescoping collar 112 and workpiece 110. Articulating head 114 is tiltable relative to telescoping collar 112 such that electrochemical machining tool 102 is able to advance in passage 108 in a non-linear direction. Articulating head 114 may be formed form a metal such as a steel, a steel alloy or other suitably electrically conducting material. In the illustrated embodiment, articulating head 114 includes a substantially spherical electrode 116 that may be solid or hollow depending upon the implemented embodiment.

Electrolyte circulation system 104 includes an electrolyte source 118 depicted as containing an electrolyte fluid 120. Electrolyte fluid 120 may be an acidic solution such as a strong acid including nitric acid, sulfuric acid or other suitably electrically conducting solution. Electrolyte source 118 may include a reservoir to contain electrolyte fluid 120 as well as filtration or other conditioning components for embodiments in which electrolyte circulation system 104 recirculates electrolyte fluid 120. Electrolyte circulation system 104 also includes an electrolyte pump 122, electrolyte supply line 124 and electrolyte return line 126. Electrolyte pump 122 receives electrolyte fluid 120 from electrolyte source 118 and pressurizes electrolyte fluid 120 for operations in telescoping collar 112 and passage 108. Electrolyte pump 122 may provide electrolyte fluid 120 to telescoping collar 112 at a constant pressure or at a variable pressure such as a pulsating pressure depending upon the operation being performed. Electrolyte supply line 124 provides fluid communication between electrolyte pump 122 and telescoping collar 112. Electrolyte return line 126 provides fluid communication between telescoping collar 112 and an electrolyte return location which may be electrolyte source 118. It is noted that returning electrolyte fluid 120 may include impurities such as dissolved metal from the electrochemical machining reaction and may require filtration or other conditioning prior to recirculation. Telescoping collar 112 and/or articulating head 114 include communication ports such as one or more electrolyte fluid outlets and one or more electrolyte fluid inlets to inject electrolyte fluid 120 into passage 108 forward of articulating head 114 and to receive electrolyte fluid 120 from passage 108.

Electrical system 106 includes a power supply 128 that provides a DC current to electrochemical machining tool 102 via a power and communications cable 130 that enables certain operations of electrochemical machining tool 102 and provides a voltage between articulating head 114 and workpiece 110 via electrolyte fluid 120 in passage 108 to lengthen passage 108. Electrical system 106 also includes a controller 132 that may include one or more processors such as one or more microprocessors that operate together with hardware and/or software to perform the tasks required by an electrochemical machining assembly of the present disclosure to bore a passage in an electrically conductive workpiece. In operation, controller 132 manages operations of electrochemical machining tool 102 including operations of telescoping collar 112 and articulating head 114, operations of electrolyte circulation system 104 including electrolyte pump 122 and operations of power supply 128. Controller 132 communicates with electrochemical machining tool 102 via power and communications cable 130.

Figure 5A:
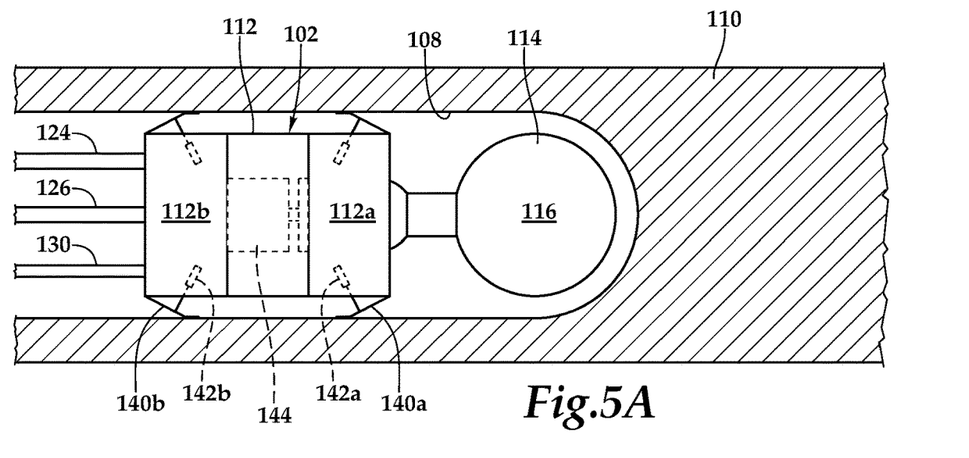
FIGS. 5A-5C are schematic illustrations of an electrochemical machining tool operating on an electrically conductive workpiece in accordance with embodiments of the present disclosure.
Figure 5B:
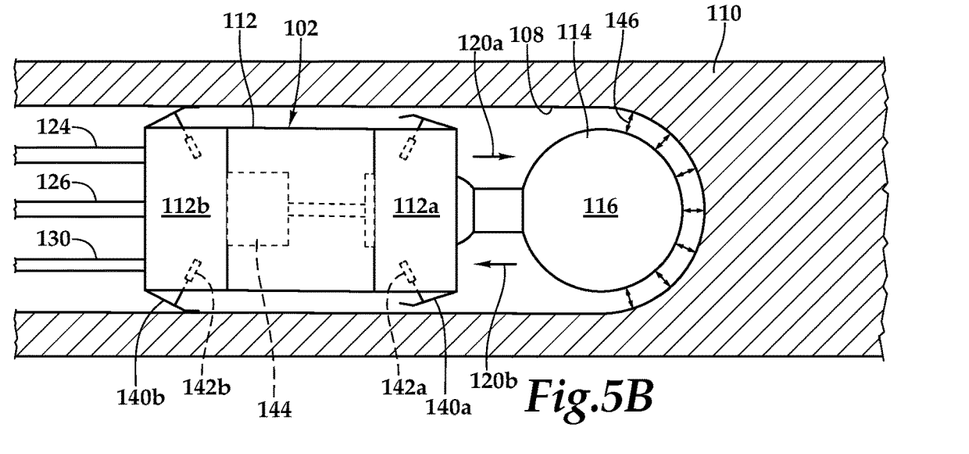
Figure 5C:
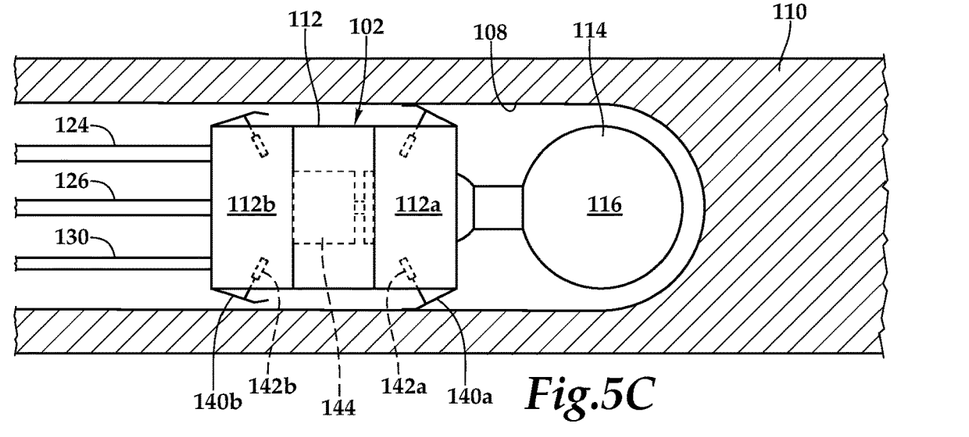

Referring additionally to FIGS. 5A-5C in the drawings, certain operations of electrochemical machining tool 102 will now be described in greater detail. In the illustrated embodiment, telescoping collar 112 includes a leading housing member 112a and a trailing housing member 112b. Leading housing member 112 includes one or more leading anchors 140a that are shiftable between gripping and non-gripping configurations responsive to operation of one or more actuators 142a. Trailing housing member 112b includes one or more trailing anchors 140b that are shiftable between gripping and non-gripping configurations responsive to operation of one or more actuators 142b. Actuators 142a, 142b may be hydraulic actuators that are operated responsive to fluid pressure provided by the electrolyte fluid and sequencing commands provided by controller 132. Alternatively, actuators 142a, 142b may be electro-mechanical actuators that are operated responsive to power from power supply 128 and sequencing commands provided by controller 132. In addition, telescoping collar 112 includes a piston assembly 144 that may be hydraulically actuated responsive to fluid pressure provided by the electrolyte fluid and sequencing commands provided by controller 132. Alternatively, piston assembly 144 may be an electro-mechanical piston assembly operated responsive to power from power supply 128 and sequencing commands provided by controller 132.

For example, when it is desired to advance electrochemical machining tool 102 within passage 108, trailing anchors 140b are in the gripping configuration (see FIGS. 5A-5B) and leading anchors 140a are actuated from the gripping configuration (see FIG. 5A) to the non-gripping configuration (see FIG. 5B). Thereafter, the telescoping collar 112 is shifted from the contracted configuration (see FIG. 5A) to the extended configuration (see FIG. 5B) by actuating piston assembly 144, which causes leading housing member 112a to translate relative to trailing housing member 112b. Leading anchors 140a are now actuated from the non-gripping configuration (see FIG. 5B) to the gripping configuration (see FIG. 5C). With leading anchors 140a in the gripping configuration, trailing anchors 140b are actuated from the gripping configuration (see FIG. 5B) to the non-gripping configuration (see FIG. 5C). Thereafter, the telescoping collar 112 is shifted from the extended configuration (see FIG. 5B) to the contracted configuration (see FIG. 5C) by actuating piston assembly 144, which causes trailing housing member 112b to translate relative to leading housing member 112a. This process is repeated to advance electrochemical machining tool 102 stepwise in passage 108.

Depending upon the step length and step rate of the stepwise movement of telescoping collar 112 and the gap required between electrode 116 and the machining surface of workpiece 110, electrochemical machining tool 102 may lengthen passage 108 during each step of electrochemical machining tool 102 and/or following each step of electrochemical machining tool 102. Lengthening of passage 108 is achieved by circulating the electrolyte fluid 120 between electrode 116 and workpiece 110, as indicated by electrolyte fluid inflow arrow 120a and electrolyte fluid outflow arrow 120b, as best seen in FIG. 5B, and by applying a voltage between electrode 116 and workpiece 110, as indicated by voltage arrows 146, which results in material being removed from workpiece 110 relative to the position of electrode 116. In the illustrated embodiment, electrolyte fluid 120 enters passage 108 from one or more electrolyte fluid outlets (not visible) in telescoping collar 112 and exits passage 108 to one or more electrolyte fluid inlets (not visible) in telescoping collar 112.

Figure 6:
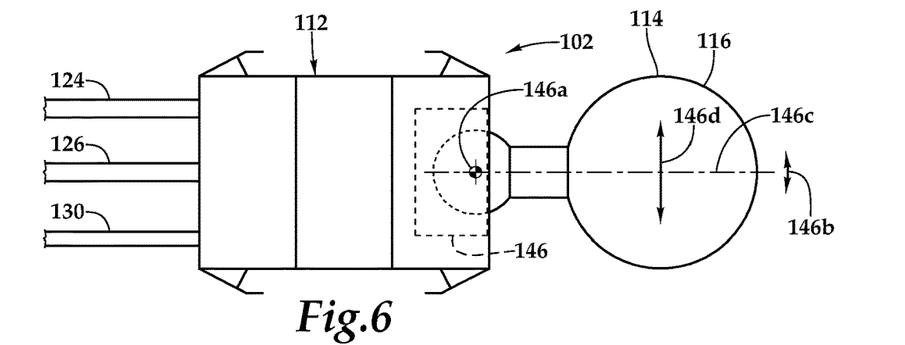
FIG. 6 is a schematic illustration of an electrochemical machining tool in accordance with embodiments of the present disclosure.

Referring additionally to FIG. 6 in the drawing, articulating head 114 has a tilting degree of freedom and a rotational degree of freedom relative to telescoping collar 112 to determine the direction of passage 108. In the illustrated embodiment, telescoping collar 112 houses an azimuth actuator 146 that is configured to tilt articulating head 114 in at least one direction about a tilting axis 146*a*, as indicated by tiling arrow 146*b*, and to rotate articulating head 114 relative to telescoping collar 112 about rotational axis 146*c*, as indicated by rotational arrow 146*d*. Azimuth actuator 146 may be an integrated actuator operable for both rotary and tilting motion or may be multiple independent actuators each operable for one of rotary and tilting motion. Azimuth actuator 146 may be one or more hydraulic actuators that are operated responsive to fluid pressure provided by the electrolyte fluid and sequencing commands provided by controller 132. Alternatively, azimuth actuator 146 may be one or more electro-mechanical actuators that are operated responsive to power from power supply 128 and sequencing commands provided by controller 132. Azimuth actuator 146 enables articulating head 114 to be tilted at a desired angle relative to telescoping collar 112 and pointed in a desired direction relative to telescoping collar 112 such that electrochemical machining tool 102 is configured to advance in any direction in three-dimensional space to form curves in a passage bored in a workpiece such as curve 108*a* and curve 108*b* in passage 108 of workpiece 110, as best seen in FIG. 4B. The ability of electrochemical machining tool 102 to advance in any direction in three-dimensional space enables electrochemical machining tool 102 to form curvilinear and/or geometrically complex passages in a workpiece. The position of electrochemical machining tool 102 within workpiece 100 can be tracked using inertial navigation on a stepwise basis. Alternatively or additionally, the position and orientation of the articulating head can be tracked using ultrasonic sensors positioned on the exterior of workpiece that receive vibrations generated from a known location on articulating head 114.

Figure 7:
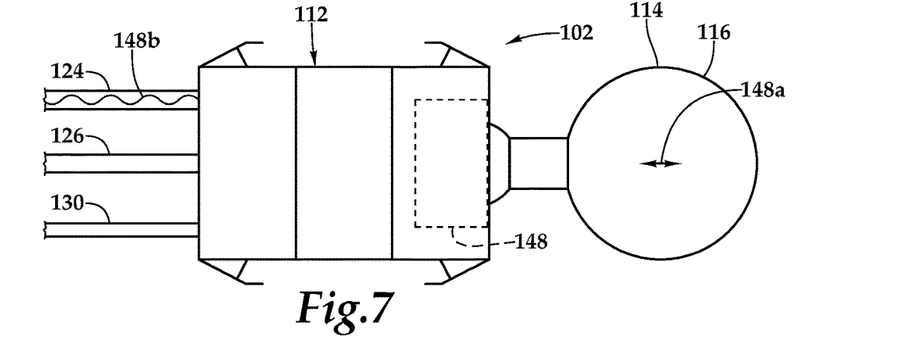
FIG. 7 is a schematic illustration of an electrochemical machining tool in accordance with embodiments of the present disclosure.

Referring additionally to FIG. 7 in the drawing, articulating head 114 may have a pulsing degree of freedom relative to telescoping collar 112 to control the gap between electrode 116 and the machining surface of workpiece 110 and thus the dissolution rate of metal therefrom. In the illustrated embodiment, telescoping collar 112 houses a pulsing actuator 148 that is configured to translate articulating head 114 in a fore-aft direction relative to telescoping collar 112, as indicated by pulsing arrow 148*a*. Pulsing actuator 148 may be a hydraulic actuator operated responsive to fluid pressure variations provided by the electrolyte fluid, as indicated by pressure wave 148*b* in electrolyte supply line 124. Alternatively, pulsing actuator 148 may be an electro-mechanical actuator that is operated responsive to power from power supply 128 and sequencing commands provided by controller 132. Controller 132 is configured to control the frequency and magnitude of the pressure pulses provided by the electrolyte fluid. Alternatively or additionally, the dissolution rate of metal from the machining surface of workpiece 110 may be controlled using power supply 128 to provide a pulsed voltage. In this case, controller 132 is configured to control the frequency, voltage and pulse duration of the voltage supplied to electrode 116 to selectively generate the required voltage between electrode 116 and the machining surface of workpiece 110.

Figure 8:
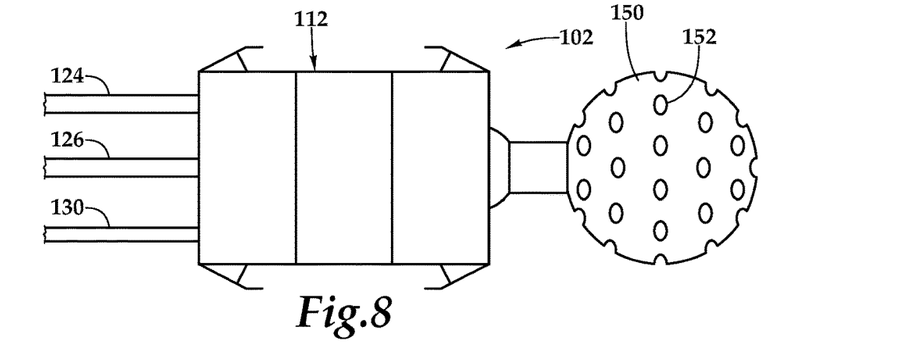
FIG. 8 is a schematic illustration of an electrochemical machining tool in accordance with embodiments of the present disclosure.

Referring now to FIG. 8 in the drawing, an articulating head 150 has one or more ports 152 that may serve as electrolyte fluid outlets that inject the electrolyte fluid into the passage forward of articulating head 150 such that the electrolyte fluid can provide a conductive path in the gap between articulating head 150 and the machining surface of workpiece 110. Such electrolyte fluid outlets in articulating head 150 may be in addition to or an alternative to electrolyte fluid outlets in telescoping collar 112. As another alternative, certain of ports 152 in articulating head 150 may serve as electrolyte fluid outlets while other ports 152 in articulating head 150 may serve as electrolyte fluid inlets to receive return electrolyte fluid.

Figure 9:
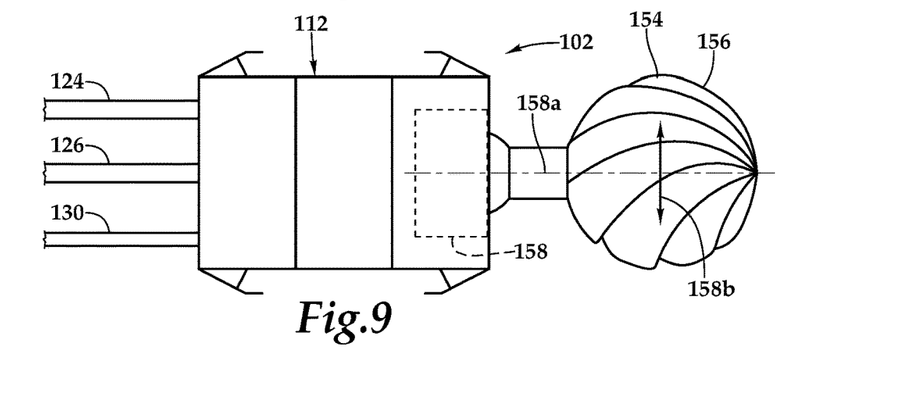
FIG. 9 is a schematic illustration of an electrochemical machining tool in accordance with embodiments of the present disclosure.

Referring now to FIG. 9 in the drawing, articulating head 154 include a substantially spherical electrode 156 that has a nonuniform outer surface such that the gap between electrode 156 and the machining surface of workpiece 110 is nonuniform. In this embodiment, articulating head 154 has a rotational degree of freedom relative to telescoping collar 112 that is controlled by a rotary actuator 158 that is configured to rotate articulating head 154 relative to telescoping collar 112 about rotational axis 158*a*, as indicated by rotational arrow 158*b*. Rotary actuator 158 may be a hydraulic actuator operated responsive to fluid pressure provided by the electrolyte fluid and sequencing commands provided by controller 132. Alternatively, rotary actuator 158 may be an electro-mechanical actuator that is operated responsive to power from power supply 128 and sequencing commands provided by controller 132. Rotation of an electrode with a nonuniform outer surface acts similar to the pulsing degree of freedom and/or the pulsed voltage embodiment discussed above providing an additional means of controlling the dissolution rate of metal from the machining surface of workpiece 110.

Figure 10A:
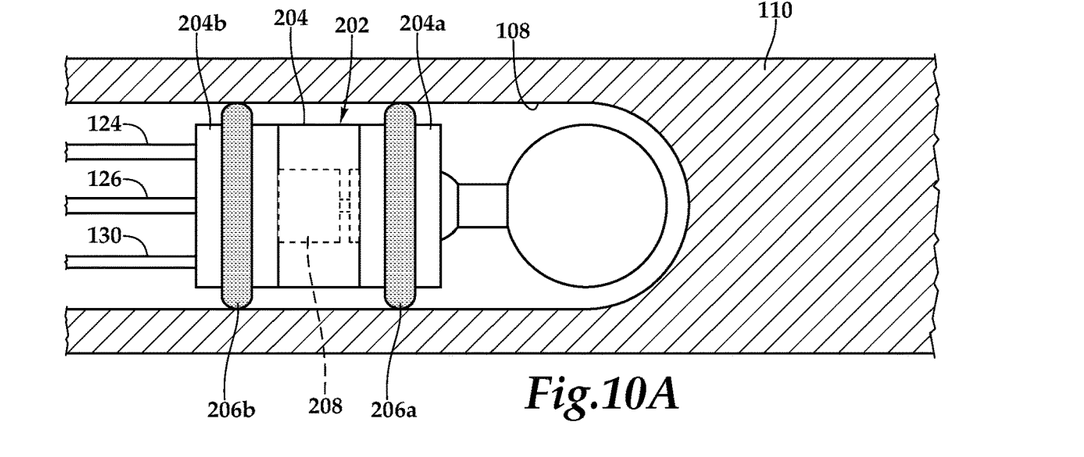
FIGS. 10A-10C are schematic illustrations of an electrochemical machining tool operating on an electrically conductive workpiece in accordance with embodiments of the present disclosure.
Figure 10B:
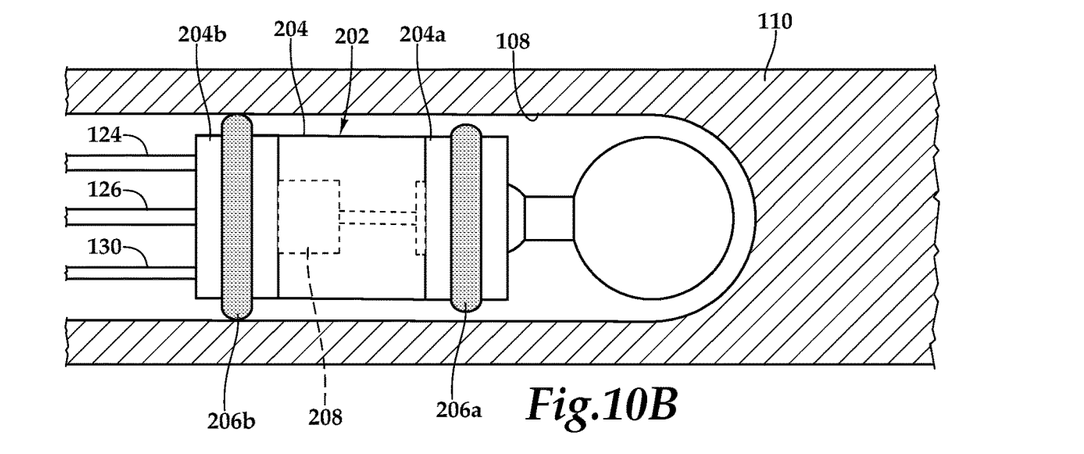
Figure 10C:
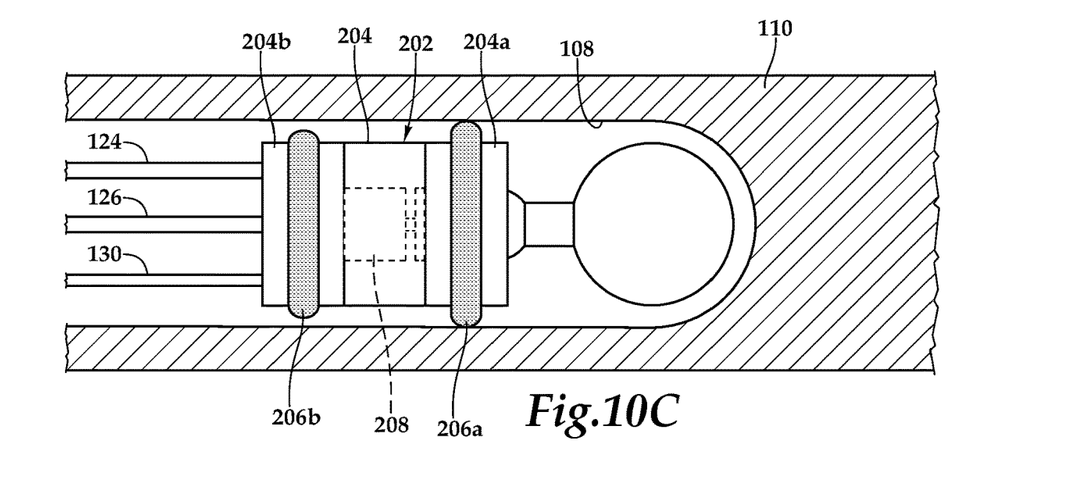

Referring to FIGS. 10A-10C in the drawings, certain operations of an electrochemical machining tool 202 will now be described. In the illustrated embodiment, telescoping collar 204 includes a leading housing member 204*a* and a trailing housing member 204*b*. Leading housing member 204*a* include a leading seal 206*a* that is shiftable between sealing and non-sealing configurations. Trailing housing member 204*b* includes a trailing seal 206*b* that is shiftable between sealing and non-sealing configurations. Leading seal 206*a* and trailing seal 206*b* may be solid or hollow polymeric O-rings such as rubber O-rings. Leading seal 206*a* and trailing seal 206*b* may be hydraulically actuated between sealing and non-sealing configurations responsive to fluid pressure provided by the electrolyte fluid and sequencing commands provided by controller 132. For example, the electrolyte fluid pressure may be routed to and from an interior portion of leading seal 206*a* and trailing seal 206*b* to expand and contract leading seal 206*a* and trailing seal 206*b* between sealing and non-sealing configurations. Alternatively, leading seal 206*a* and trailing seal 206*b* may be electro-mechanically actuated responsive to power from power supply 128 and sequencing commands provided by controller 132. For example, wedge elements may be moved relative to leading seal 206*a* and trailing seal 206*b* to radially shift leading seal 206*a* and trailing seal 206*b* between sealing and non-sealing configurations. In addition, telescoping collar 204 includes a piston assembly 208 that may be hydraulically actuated responsive to fluid pressure provided by the electrolyte fluid and sequencing commands provided by controller 132. Alternatively, piston assembly 208 may be an electro-mechanical piston assembly operated responsive to power from power supply 128 and sequencing commands provided by controller 132.

When it is desired to advance electrochemical machining tool 202 within passage 108, trailing seal 206b is in the sealing configuration (see FIGS. 10A-10B) and leading seal 206a is actuated from the sealing configuration (see FIG. 10A) to the non-sealing configuration (see FIG. 10B). Thereafter, the telescoping collar 204 is shifted from the contracted configuration (see FIG. 10A) to the extended configuration (see FIG. 10B) by actuating piston assembly 208, which causes leading housing member 204a to translate relative to trailing housing member 204b. Leading seal 206a is now actuated from the non-sealing configuration (see FIG. 10B) to the sealing configuration (see FIG. 10C). With leading seal 206a in the sealing configuration, trailing seal 206b is actuated from the sealing configuration (see FIG. 10B) to the non-sealing configuration (see FIG. 10C). Thereafter, the telescoping collar 204 is shifted from the extended configuration (see FIG. 10B) to the contracted configuration (see FIG. 10C) by actuating piston assembly 208, which causes trailing housing member 204b to translate relative to leading housing member 204a. This process is repeated to advance electrochemical machining tool 202 stepwise in passage 108.

Figure 11A:
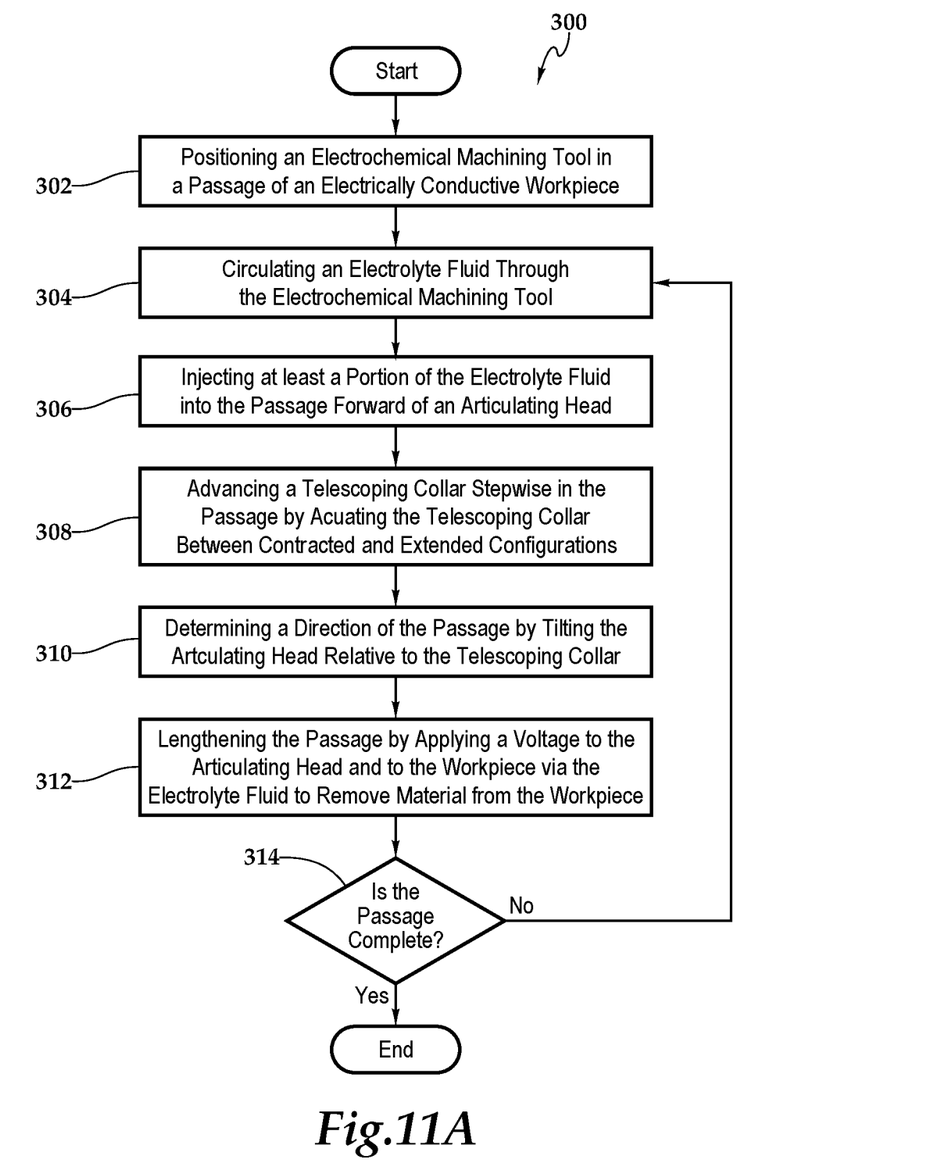
FIGS. 11A-11C are flow diagrams depicting various methods related to boring a passage in an electrically conductive workpiece with an electrochemical machining assembly in accordance with embodiments of the present disclosure.

An electrochemical machining method embodiment for boring a passage in an electrically conductive workpiece will now be described with reference to FIG. 11A of the drawings. Method 300 includes positioning an electrochemical machining tool in a passage of an electrically conductive workpiece, at step 302. The electrochemical machining tool may include a telescoping collar with an articulating head coupled thereto. The method includes circulating an electrolyte fluid through the electrochemical machining tool, at step 304, and injecting at least a portion of the electrolyte fluid into the passage forward of the articulating head, at step 306. The method further includes advancing the telescoping collar stepwise in the passage, at step 308. This step may be accomplished by hydraulically actuating the telescoping collar between contracted and extended configurations responsive to fluid pressure provided by the electrolyte fluid, electro-mechanically actuating the telescoping collar between contracted and extended configurations or combinations thereof. The method also includes determining a direction of the passage by tilting the articulating head relative to the telescoping collar, at step 310, and lengthening the passage by applying a voltage between the articulating head and the workpiece via the electrolyte fluid to remove material from the workpiece, at step 312. If the passage is complete at decision 314, the method ends. If the passage is not complete at decision 314, the method repeats steps 304-312 until the passage is complete at decision 314.

Figure 11B:
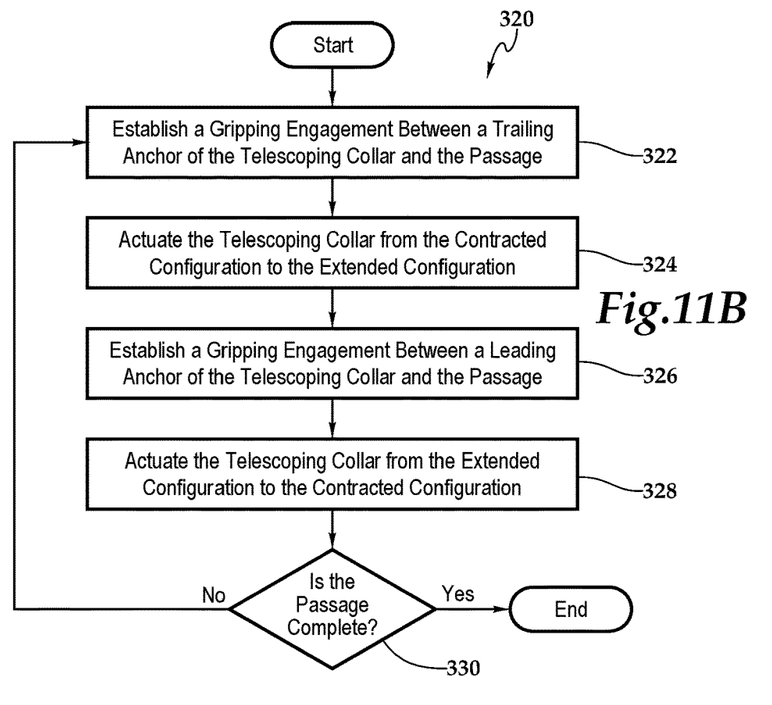

Referring additionally to FIG. 11B of the drawings, certain details relating to an embodiment of step 308 of method 300 will be described in method 320. Method 320 includes establishing a gripping engagement between a trailing anchor of the telescoping collar and the passage, at step 322. This step may be accomplished by hydraulically actuating the trailing anchor from a non-gripping configuration to a gripping configuration responsive to fluid pressure provided by the electrolyte fluid, by electro-mechanically actuating the trailing anchor from the non-gripping configuration to the gripping configuration or combinations thereof. The method also includes actuating the telescoping collar from the contracted configuration to the extended configuration, at step 324. This step may be accomplished by hydraulically actuating the telescoping collar responsive to fluid pressure provided by the electrolyte fluid, electro-mechanically actuating the telescoping collar or combinations thereof. The method additionally includes establishing a gripping engagement between a leading anchor of the telescoping collar and the passage, at step 326. This step may be accomplished by hydraulically actuating the leading anchor from a non-gripping configuration to a gripping configuration responsive to fluid pressure provided by the electrolyte fluid, by electro-mechanically actuating the leading anchor from the non-gripping configuration to the gripping configuration or combinations thereof. The method further includes actuating the telescoping collar from the extended configuration to the contracted configuration, at step 328. This step may be accomplished by hydraulically actuating the telescoping collar responsive to fluid pressure provided by the electrolyte fluid, electro-mechanically actuating the telescoping collar or combinations thereof. If the passage is complete at decision 330, the method ends. If the passage is not complete at decision 330, the method repeats steps 322-328 until the passage is complete at decision 330.

Figure 11C:
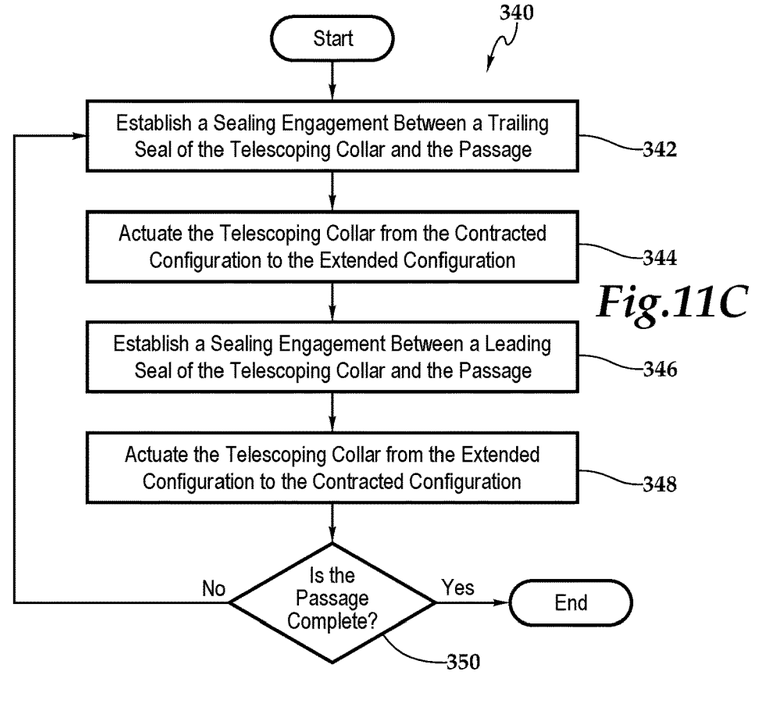

Referring additionally to FIG. 11C of the drawings, certain details relating to another embodiment of step 308 of method 300 will be described in method 340. Method 340 includes establishing a sealing engagement between a trailing seal of the telescoping collar and the passage, at step 342. This step may be accomplished by hydraulically actuating the trailing seal from a non-sealing configuration to a sealing configuration responsive to fluid pressure provided by the electrolyte fluid, by electro-mechanically actuating the trailing seal from the non-sealing configuration to the sealing configuration or combinations thereof. The method also includes actuating the telescoping collar from the contracted configuration to the extended configuration, at step 344. This step may be accomplished by hydraulically actuating the telescoping collar responsive to fluid pressure provided by the electrolyte fluid, electro-mechanically actuating the telescoping collar or combinations thereof. The method additionally includes establishing a sealing engagement between a leading seal of the telescoping collar and the passage, at step 346. This step may be accomplished by hydraulically actuating the leading seal from a non-sealing configuration to a sealing configuration responsive to fluid pressure provided by the electrolyte fluid, by electro-mechanically actuating the leading seal from the non-sealing configuration to the sealing configuration or combinations thereof. The method further includes actuating the telescoping collar from the extended configuration to the contracted configuration, at step 348. This step may be accomplished by hydraulically actuating the telescoping collar responsive to fluid pressure provided by the electrolyte fluid, by electro-mechanically actuating the telescoping collar or combinations thereof. If the passage is complete at decision 350, the method ends. If the passage is not complete at decision 350, the method repeats steps 342-348 until the passage is complete at decision 350.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An electrochemical machining assembly for boring a passage in an electrically conductive workpiece, the electrochemical machining assembly comprising:
   an electrochemical machining tool including a telescoping collar and an articulating head coupled to the telescoping collar, the telescoping collar having a contracted configuration and an extended configuration;
   an electrolyte circulation system configured to supply an electrolyte fluid to the electrochemical machining tool and receive the electrolyte fluid returning from the electrochemical machining tool; and
   a power supply configured to provide a voltage to the articulating head;
   wherein, the telescoping collar is actuatable between the contracted configuration and the extended configuration to advance the telescoping collar stepwise in the passage;
   wherein, the articulating head is tiltable relative to the telescoping collar to determine a direction of the passage; and
   wherein, the electrochemical machining assembly is configured to remove material from the workpiece upon application of the voltage between the articulating head and the workpiece via the electrolyte fluid to lengthen the passage.

2. The electrochemical machining assembly as recited in claim 1 wherein the telescoping collar is substantially cylindrical.

3. The electrochemical machining assembly as recited in claim 1 wherein the telescoping collar further comprises an electrical insulating material.

4. The electrochemical machining assembly as recited in claim 1 wherein the telescoping collar further comprises leading and trailing housing members configured to translate relative to one another to shift the telescoping collar between the contracted and extended configurations.

5. The electrochemical machining assembly as recited in claim 1 wherein the telescoping collar further comprises leading and trailing anchors;
   wherein the trailing anchor has a gripping engagement with the passage when the telescoping collar shifts from the contracted configuration to the extended configuration; and
   wherein the leading anchor has a gripping engagement with the passage when the telescoping collar shifts from the extended configuration to the contracted configuration.

6. The electrochemical machining assembly as recited in claim 5 wherein the leading and trailing anchors are mechanically actuated between gripping and non-gripping configurations.

7. The electrochemical machining assembly as recited in claim 1 wherein the telescoping collar further comprises leading and trailing seals;
   wherein the trailing seal has a sealing engagement with the passage when the telescoping collar shifts from the contracted configuration to the extended configuration; and
   wherein the leading seal has a sealing engagement with the passage when the telescoping collar shifts from the extended configuration to the contracted configuration.

8. The electrochemical machining assembly as recited in claim 7 wherein the leading and trailing seals are mechanically actuated between sealing and non-sealing configurations.

9. The electrochemical machining assembly as recited in claim 1 wherein the articulating head further comprises a substantially spherical head.

10. The electrochemical machining assembly as recited in claim 1 wherein the articulating head further comprises an electrically conductive material.

11. The electrochemical machining assembly as recited in claim 1 wherein the articulating head further comprises one or more electrolyte fluid outlets configured to inject the electrolyte fluid into the passage forward of the articulating head.

12. The electrochemical machining assembly as recited in claim 1 wherein the articulating head has a tilting degree of freedom and a rotational degree of freedom relative to the telescoping collar.

13. The electrochemical machining assembly as recited in claim 1 further comprising at least one actuator disposed within the telescoping collar configured to tilt the articulating head relative to the telescoping collar.

14. The electrochemical machining assembly as recited in claim 1 further comprising at least one actuator disposed within the telescoping collar configured to rotate the articulating head relative to the telescoping collar.

15. The electrochemical machining assembly as recited in claim 1 wherein the voltage provided by the power supply further comprises a pulsed voltage.

16. The electrochemical machining assembly as recited in claim 1 wherein the passage further comprises one of a non-linear passage or a geometrically complex passage.

17. A method of boring a passage in an electrically conductive workpiece, the method comprising:
   positioning an electrochemical machining tool in the passage, the electrochemical machining tool including a telescoping collar and an articulating head coupled to the telescoping collar;
   circulating an electrolyte fluid through the electrochemical machining tool;
   injecting at least a portion of the electrolyte fluid into the passage forward of the articulating head;
   advancing the telescoping collar stepwise in the passage by actuating the telescoping collar between contracted and extended configurations;
   determining a direction of the passage by tilting the articulating head relative to the telescoping collar; and
   lengthening the passage by applying a voltage between the articulating head and the workpiece via the electrolyte fluid to remove material from the workpiece.

18. The method as recited in claim 17 wherein lengthening the passage further comprises forming one of a non-linear passage or a geometrically complex passage.

19. The method as recited in claim 17 wherein advancing the telescoping collar stepwise in the passage further comprises:
   establishing a gripping engagement between a trailing anchor of the telescoping collar and the passage;
   actuating the telescoping collar from the contracted configuration to the extended configuration;
   establishing a gripping engagement between a leading anchor of the telescoping collar and the passage; and
   actuating the telescoping collar from the extended configuration to the contracted configuration.

20. The method as recited in claim 17 wherein advancing the telescoping collar stepwise in the passage further comprises:
- establishing a sealing engagement between a trailing seal of the telescoping collar and the passage;
- actuating the telescoping collar from the contracted configuration to the extended configuration;
- establishing a sealing engagement between a leading seal of the telescoping collar and the passage; and
- actuating the telescoping collar from the extended configuration to the contracted configuration.

* * * * *